C. S. CAFFREY.
Carriage-Spring Attachment.

No. 162,027.　　　　　　　　　　　　　　Patented April 13, 1875.

Witnesses:
Jos. S. Coombs
Y. Y. Peters

Inventor:
Charles S. Caffrey
By James L. Norris.
Atty.

THE GRAPHIC CO.PHOTO-LITH.39 & 41 PARK PLACE,N.Y.

UNITED STATES PATENT OFFICE.

CHARLES S. CAFFREY, OF CAMDEN, NEW JERSEY.

IMPROVEMENT IN CARRIAGE-SPRING ATTACHMENTS.

Specification forming part of Letters Patent No. 162,027, dated April 13, 1875; application filed January 4, 1875.

*To all whom it may concern:*

Be it known that I, CHARLES F. CAFFREY, of Camden, Camden county, New Jersey, have invented a certain new and useful Improvement in Spring-Connection for Side-Bar Wagons, of which the following is a specification:

The object of the present invention is to provide a simple and effective coupling for connecting the transverse body-supporting springs with the side bars of wagons, by the use of which the springs are permitted to move or oscillate upon their joints in a free and easy manner, and with comparatively little friction and noise.

The invention consists in an anti-friction joint, which comprises a square bolt and a pair of encircling sleeves, carried by the head or box-shaped end of the body-supporting spring, and a bearing-piece having a cylindrical socket for the reception of the anti-friction bolt, and provided with a flange or top plate for attaching the bearing to the side bar of a wagon.

Figure 1:
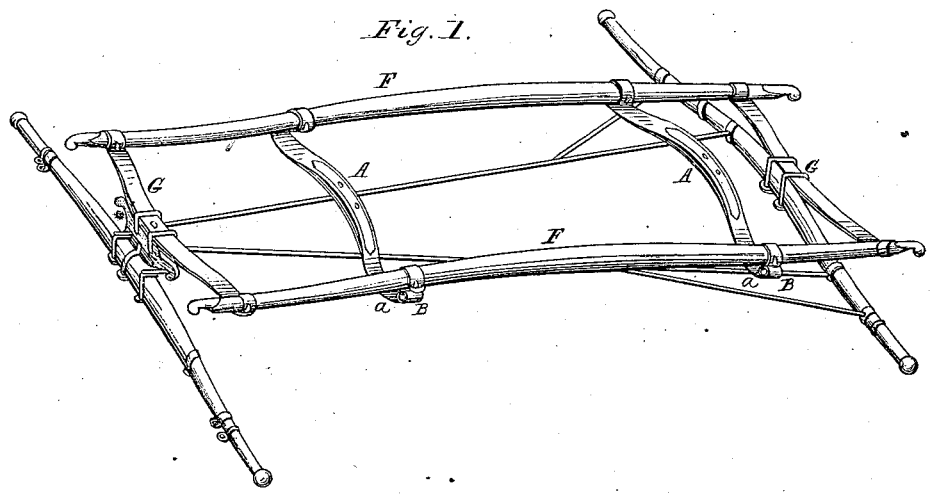
Figure 2:
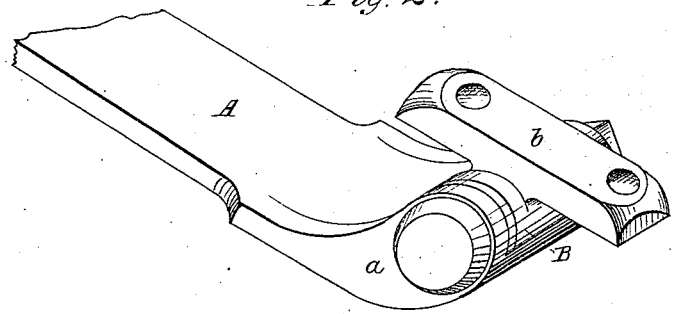
Figure 3:
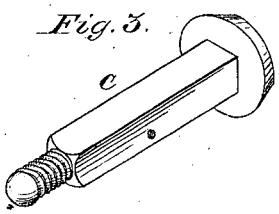
Figure 4:
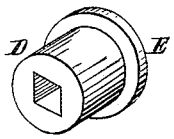
Figure 5:
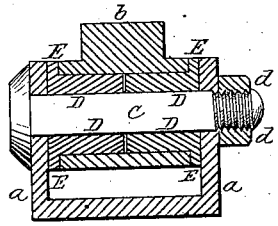

In the accompanying drawing, Figure 1 is a perspective view of the running-gear of a side-bar wagon, in which the cross-springs are secured to the side bars by my novel form of anti-friction joint. Fig. 2 is a perspective view of the joint and a portion of the cross-spring. Fig. 3 is a perspective view of the bolt detached. Fig. 4 is a perspective view of the sleeves or collars detached. Fig. 5 is a longitudinal section of the joint.

In the drawing, the letter F designates the longitudinal side bars of a side-bar wagon, and G the ordinary half-elliptical springs which connect the bars with the front and rear axles. The cross-springs A, upon which the body rests, are provided with heads having lateral ears or flanges $a$, which embrace or are located on opposite sides of a cylindrical bearing, B, that is secured to the side bar by means of a top flange or plate, $b$, and a clip or bolt passing through the flange and the side bar. The joint or axis of the opening is formed by an anti-friction bolt, which is composed of an angular or square bolt, C, and two encircling sleeves or thimbles, D, of a soft or anti-friction metal. The sleeves are fixed on the square bolt, so as to turn with the same, and are provided with end flanges E, which move on or turn in contact with the end faces of the bearing B. The sleeves are first inserted into the cylindrical bore of the bearing B from the opposite ends of the same, and then, after the spring-head has been fitted on the bearing, the square bolt is passed through the side ears of the spring-head, and through the anti-friction sleeves, and then a nut, $d$, is applied to the threaded end of the bolt, which completes the coupling operation.

It will be obvious that the anti-friction bolt turns with the cross-spring as the same changes its position when depressed or elevated, and as every portion in frictional contact is of a soft metal, friction on the bolt is overcome or materially reduced; and even if the sleeves wear away, they can be replaced by new ones with ease and facility.

Cross-springs, connected to the side bars in the manner proposed by me, turn with little or no noise; and, furthermore, by the presence of the anti-friction sleeves, the springs are permitted to move on their joints with ease and freedom.

The body-supporting springs only are shown as being connected to the side bars by my improved form of joint; but, when deemed desirable, the end or half-springs may be similarly connected.

What I claim is—

The combination of the cylindrical bearing B with the side bar of a wagon, square bolt C, flanged thimbles D E, and the body-supporting cross-spring A, having flanged end head $a$, substantially as and for the purpose set forth.

In testimony that I claim the foregoing I have hereunto set my hand.

CHARLES S. CAFFREY.

Witnesses:
JAMES M. CASSADY,
T. F. BOARDMAN.